United States Patent
Wang et al.

(10) Patent No.: US 10,189,075 B2
(45) Date of Patent: Jan. 29, 2019

(54) METHOD OF RIVETING INVOLVING ULTRASONIC PULSES

(71) Applicant: GM GLOBAL TECHNOLOGY OPERATIONS LLC, Detroit, MI (US)

(72) Inventors: Pei-Chung Wang, Troy, MI (US); Bradley J. Blaski, Sterling Heights, MI (US); Richard C. Janis, Grosse Pointe Woods, MI (US); Susan M. Smyth, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 205 days.

(21) Appl. No.: 15/413,524

(22) Filed: Jan. 24, 2017

(65) Prior Publication Data
US 2018/0207711 A1   Jul. 26, 2018

(51) Int. Cl.
*B21J 15/12* (2006.01)
*B21J 15/02* (2006.01)
*B21J 15/04* (2006.01)
*B21J 15/08* (2006.01)
*B21J 15/14* (2006.01)
*B21J 15/36* (2006.01)
*F16B 5/04* (2006.01)
*F16B 19/08* (2006.01)
*F16B 19/10* (2006.01)

(52) U.S. Cl.
CPC ............ *B21J 15/12* (2013.01); *B21J 15/025* (2013.01); *B21J 15/043* (2013.01); *B21J 15/08* (2013.01); *B21J 15/147* (2013.01); *B21J 15/36* (2013.01); *F16B 5/04* (2013.01); *F16B 19/086* (2013.01); *F16B 19/1054* (2013.01)

(58) Field of Classification Search
CPC ...... B21J 15/041; B21J 15/043; B21J 15/045; B21J 15/08; B21J 15/025; B21J 15/36; F16B 19/086; F16B 37/14
USPC ....................... 411/501, 372.5–377
See application file for complete search history.

(56) References Cited

U.S. PATENT DOCUMENTS

| | | | | |
|---|---|---|---|---|
| 3,747,382 A | * | 7/1973 | McMaster | B21J 15/02 29/243.53 |
| 7,862,271 B2 | | 1/2011 | Wang et al. | |
| 2015/0144602 A1 | * | 5/2015 | Draht | B23K 9/20 219/91.23 |
| 2016/0341234 A1 | * | 11/2016 | Germann | F16B 17/00 |

* cited by examiner

*Primary Examiner* — David Bryant
*Assistant Examiner* — Nirvana Deonauth
(74) *Attorney, Agent, or Firm* — Quinn IP Law

(57) ABSTRACT

A method of riveting a first substrate and a second substrate with a rivet includes delivering a first ultrasonic pulse to a respective exterior surface of the first substrate at a predefined target area, via an ultrasonic device. The first ultrasonic pulse is configured to soften the first substrate at a first softening temperature. The method includes attaching a crust layer on a rivet head of the rivet. A second ultrasonic pulse is delivered to the predefined target area to soften the crust layer at a second softening temperature, via the ultrasonic device. A surface profile of the crust layer is fashioned via compression of a horn inner cavity of the ultrasonic device over the crust layer. The crust layer is cooled to harden into a seal configured to prevent entry of moisture between the rivet and the respective exterior surface of the first substrate, thereby reducing galvanic corrosion.

15 Claims, 3 Drawing Sheets

METHOD OF RIVETING INVOLVING ULTRASONIC PULSES

INTRODUCTION

The disclosure relates generally to a method of riveting involving ultrasonic pulses. In many industries, self-piercing rivets are employed for joining various materials. Over time, galvanic corrosion may result for various reasons, including encroachment of moisture through gaps between the rivet and the surrounding materials.

SUMMARY

A method of riveting a first substrate and a second substrate with a rivet includes placing respective interior surfaces of the first and second substrates adjacent to one another at a predefined target area. A first ultrasonic pulse is delivered to a respective exterior surface of the first substrate at the predefined target area, via an ultrasonic device. The first ultrasonic pulse is configured to soften the first and second substrates at a first softening temperature. The first substrate and the second substrate may each be composed of carbon fiber nylon composite.

The rivet includes a rivet head and rivet body. The method includes attaching (coating, joining or otherwise connecting) a crust layer on the rivet head. The crust layer and the rivet head may be composed of dissimilar materials. The rivet may be composed of a metal. The crust layer may be composed of a thermoplastic composite, which softens and melts when heated to a specific temperature and hardens and strengthens after cooling. Attaching the crust layer on the rivet head may include: dipping the rivet head into a molten solution, and solidifying the molten solution to form the crust layer. Attaching the crust layer on the rivet head may include applying an adhesive layer between the crust layer and the rivet head. The adhesive layer is sufficiently cured such that a melting point of the adhesive layer is higher than a melting point of the crust layer.

A joint is formed by inserting the rivet into the first and second substrates at the predefined target area. In accordance with a first embodiment, the rivet is positioned at the predefined target area and a compressive force is applied, via a horn of the ultrasonic device, to push the rivet body into the first and second substrates at the predefined target area.

In accordance with a second embodiment, the rivet includes a mandrel positioned in a rivet body with a hollow center, the mandrel having a mandrel head and a mandrel stem. The mandrel head is axially loaded with sufficient pull force into the hollow center such that the rivet body expands against the first and second substrates. The mandrel is configured to break at a notch at a predetermined resisting force. A joint is formed with the rivet body such that the mandrel head is encapsulated at a blind side of the predefined target area and the mandrel stem is ejected.

A second ultrasonic pulse is delivered to the predefined target area such that sufficient heat is generated to soften the crust layer at a second softening temperature, via the ultrasonic device. The second ultrasonic pulse has a relatively higher energy than the first ultrasonic pulse. The second softening temperature may be higher than the first softening temperature.

The crust layer is cooled down to harden into a seal configured to prevent entry of moisture between the rivet and the respective exterior surfaces of the first and/or second substrates, thereby reducing galvanic corrosion. The surface quality of the riveted joint is also improved. The ultrasonic device includes a horn having a horn inner cavity. The surface profile of the crust layer may be fashioned via compression of the horn inner cavity over the crust layer. The surface profile of the crust layer is configured to inversely correspond to a shape of the horn inner cavity.

The ultrasonic device includes an anvil having an anvil inner cavity. The method may further include melting a portion of the respective exterior surface of the second substrate at the predefined target area, via the second ultrasonic pulse, to create a button layer at least partially around the rivet body. A surface profile of the button layer may be fashioned via compression of the anvil inner cavity over the button layer. The surface profile of the button layer is configured to inversely correspond to a shape of the anvil inner cavity.

The above features and advantages and other features and advantages of the present disclosure are readily apparent from the following detailed description of the best modes for carrying out the disclosure when taken in connection with the accompanying drawings.

DETAILED DESCRIPTION

Figure 1:
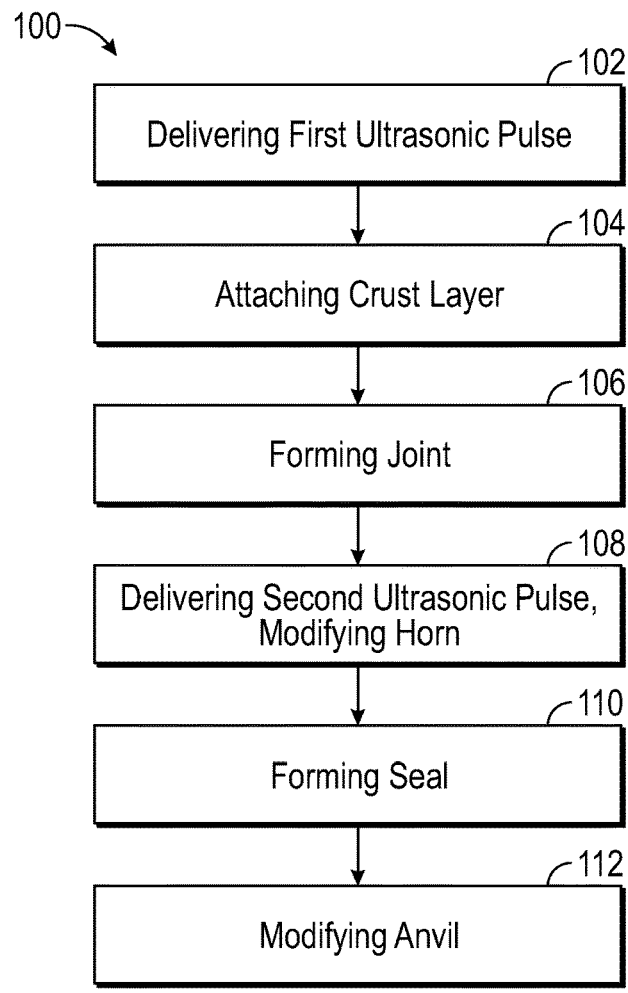
FIG. 1 is a flowchart of a method of riveting a first and second substrate with a rivet.
Figure 2:
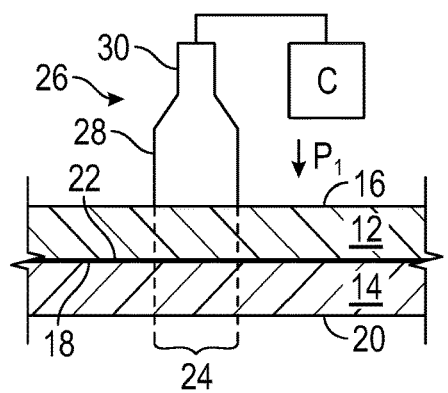
FIG. 2 is a schematic diagram of the first and second substrates, showing application of a first ultrasonic pulse.

Referring to the drawings, wherein like reference numbers refer to like components, FIG. 1 is a flowchart of a method 100 of riveting a first substrate 12 and a second substrate 14 (shown in FIGS. 2-6) involving ultrasonic pulses. FIG. 2 is a schematic diagram of the first and second substrates 12, 14. Referring to FIG. 2, the first substrate has a respective exterior surface 16 and a respective interior surface 18. The second substrate has a respective exterior surface 20 and a respective interior surface 22. The method 100 may be applied to riveting of multiple work pieces such that the number of substrates exceeds two.

The first substrate 12 and the second substrate 14 may be composed of identical materials. The first substrate 12 and the second substrate 14 may be composed of dissimilar materials. In one example, the first substrate 12 and the second substrate 14 are both composed of carbon fiber nylon 6 (polycaprolactam) composite. In another example, the first substrate 12 is composed of a thermoplastic and the second substrate 14 is composed of a metal.

The method 100 need not be applied in the specific order recited herein and it is to be understood that some steps may be eliminated. The method 100 may begin with block 102, where the respective interior surfaces 18, 22 of the first and second substrates 12, 14 are positioned adjacent to one another at a predefined target area 24 (see FIG. 2) and a first ultrasonic pulse ($P_1$) is delivered to the respective exterior surface 16 at the predefined target area 24. The first ultrasonic pulse ($P_1$) is delivered via an ultrasonic device 26 and is configured to soften the first and second substrates 12, 14 at a first softening temperature. The first ultrasonic pulse ($P_1$) is configured to soften the first and second substrates 12, 14 sufficiently so that the cracking of the first and second substrates 12, 14 (resulting from riveting and/or low ductility) may be avoided. The first ultrasonic pulse results in efficient and localized heating. Other heating methods may be applied.

The ultrasonic device 26 is configured to apply ultrasonic vibrations to the predefined target area 24. Referring to FIG. 2, the ultrasonic device 26 may include a horn 28, a transducer 30 and anvil 32. The transducer 30 is configured to transform an output voltage of a power source (not shown) into a mechanical vibration or amplitude. The horn 28 is configured to efficiently transfer the acoustic energy from the transducer 30 (via an amplifier or other devices) into the predefined target area 24. The first ultrasonic pulse ($P_1$) causes localized softening of the first and second substrates 12, 14 due to heat generated at the interfaces. The first ultrasonic pulse ($P_1$) is configured such that no weld is formed at the predefined target area 24, for example, by being of insufficient intensity.

The horn 28 may be formed with a shape, cross-section and length suitable to the application at hand. The length of the horn 28 is selected such that there is mechanical resonance at the desired ultrasonic frequency of operation. The specific frequency of ultrasound produced by the transducer 30 may vary based on the application. The frequency of ultrasound vibration may range from 15 to 300 kHz. The ultrasonic device 26 may include other electronic or acoustic components required for functioning of the ultrasonic device 26. Referring to FIG. 2, the ultrasonic device 26 is operatively connected to a controller C, which may include other driver circuits (not shown) and other components for controlling the ultrasonic device 26.

Figure 3:
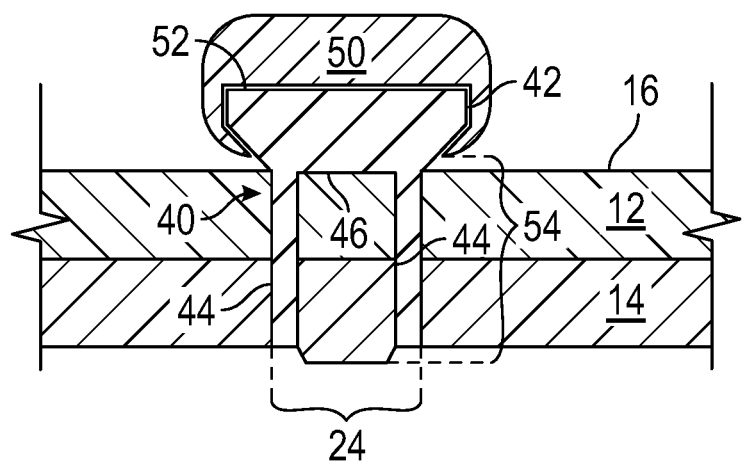
FIG. 3 is a schematic diagram of an example rivet and joint, prior to application of a second ultrasonic pulse and in accordance with a first embodiment.

Referring now to FIG. 3, schematic diagram is shown of an example rivet 40. The rivet 40 has a rivet head 42 at one end, the rivet head 42 being contiguous with a rivet body 44 at another end. The rivet body 44 may extend circumferentially around an outer periphery of the rivet 40, surrounding a hollow center 46.

The method 100 proceeds to block 104, where a crust layer 50 is attached (coated, joined or otherwise connected) on the rivet head 42. The crust layer 50 and the rivet head 42 may be composed of dissimilar materials. In one embodiment, the crust layer 50 is composed of a thermoplastic composite, which softens and melts when heated to a specific temperature and hardens and strengthens after cooling. The rivet 40 may be composed of a metal or other suitable material.

Attaching the crust layer 50 on the rivet head 42 may include dipping the rivet head 42 into a molten solution (of the crust material), and solidifying the molten solution to form the crust layer 50. Optionally, attaching the crust layer 50 on the rivet head 42 may include applying an adhesive layer 52 between the crust layer 50 and the rivet head 42. The adhesive layer 52 is sufficiently cured such that a melting point of the adhesive layer 52 is higher than a melting point of the crust layer 50. Alternatively, strong adhesion between crust layer 50 and the rivet head 42 may be facilitated so that there is no need to use adhesive.

In block 106 of the method 100, a joint 54 is formed by inserting the rivet 40 into the first and second substrates 12, 14 at the predefined target area 24. In accordance with a first embodiment, the joint 54 may be formed by positioning the rivet 40 at the predefined target area 24 and applying a compressive force through the horn 28 of the ultrasonic device 26, thereby pushing the rivet head 42 into the first and second substrates 12, 14 at the predefined target area 24. In other words, the horn 28 is employed as a piston to push the rivet 40.

Figure 4:
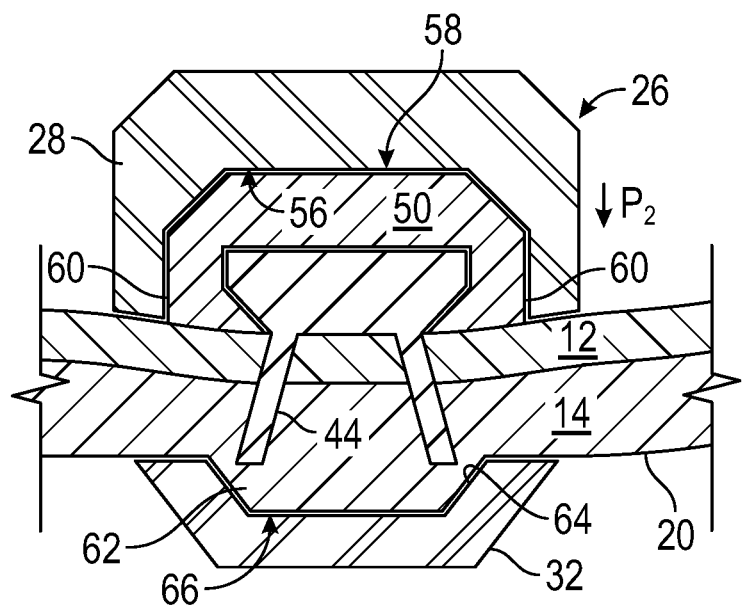
FIG. 4 is a schematic diagram of the joint of FIG. 3, after application of the second ultrasonic pulse.

In block 108 of the method 100, a second ultrasonic pulse ($P_2$) is delivered to the predefined target area 24 via the ultrasonic device 26 (see FIG. 4). The horn 28 is brought into contact with the crust layer 50 and the ultrasonic device 26 is energized for a predetermined period of time. Referring to FIG. 3, the second ultrasonic pulse ($P_2$) is configured to generate sufficient heat to soften the crust layer 50 at a second softening temperature. The second ultrasonic pulse ($P_2$) has a relatively higher energy than the first ultrasonic pulse. The second softening temperature may be higher than the first softening temperature.

FIG. 4 is a schematic diagram of the joint of FIG. 3, after application of the second ultrasonic pulse ($P_2$). In the embodiment shown in FIGS. 3-4, the first and second substrates 12, 14 are retained under a compressive force between the horn 28 and the anvil 32 for a brief dwell period. Block 108 of the method 100 may include modifying the horn 28 to have a special geometry or horn inner cavity 56 inversely corresponding to a desired shape of the crust layer 50. The surface profile 58 of the crust layer 50 is fashioned via compression of the horn inner cavity 56 over the crust layer 50. The surface profile 58 of the crust layer 50 is configured to inversely correspond to the shape or profile of the horn inner cavity 56.

In block 110 of the method 100, the molten crust layer 50 is cooled down to harden into a seal 60 configured to prevent entry of moisture (which may be water or other liquid or substance) between the rivet 40 and the respective exterior surface 16 of the first substrate 12 (between the rivet 40 and surrounding thermoplastic materials), thereby reducing galvanic corrosion. The surface quality of the (riveted) joint 54 is also improved. Alternatively, the whole rivet 40 may be covered with thermoplastic materials or materials that can melt and form the seal 60 between the rivet and surrounding substrates.

Referring to FIG. 4, the second ultrasonic pulse ($P_2$) may be configured to induce localized melting of a portion of the respective exterior surface 20 of the second substrate 14, creating a button layer 62 at least partially around the rivet body 44. Block 112 of the method 100 may include modifying the anvil 32 to have a special geometry or inner cavity 64 inversely corresponding to a desired shape of the button layer 62. Referring to FIG. 4, a surface profile 66 of the button layer 62 may be fashioned via compression of the anvil inner cavity 64 over the respective exterior surface 20 of the second substrate 14 during the second ultrasonic pulse ($P_2$). The surface profile 66 of the button layer 62 is configured to cover an area wider than the predefined target area 24 (see FIG. 3) and to prevent encroachment of moisture (which may be water or other liquid or substance) into the joint 54 via the respective exterior surface 20 of the second substrate 14

Figure 5:
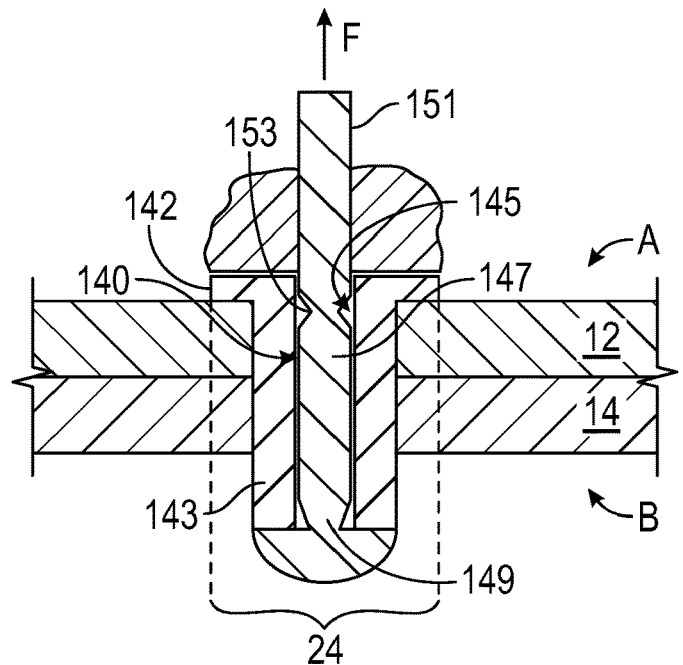
FIG. 5 is a schematic diagram of another example rivet and joint, in accordance with a second embodiment.
Figure 6:
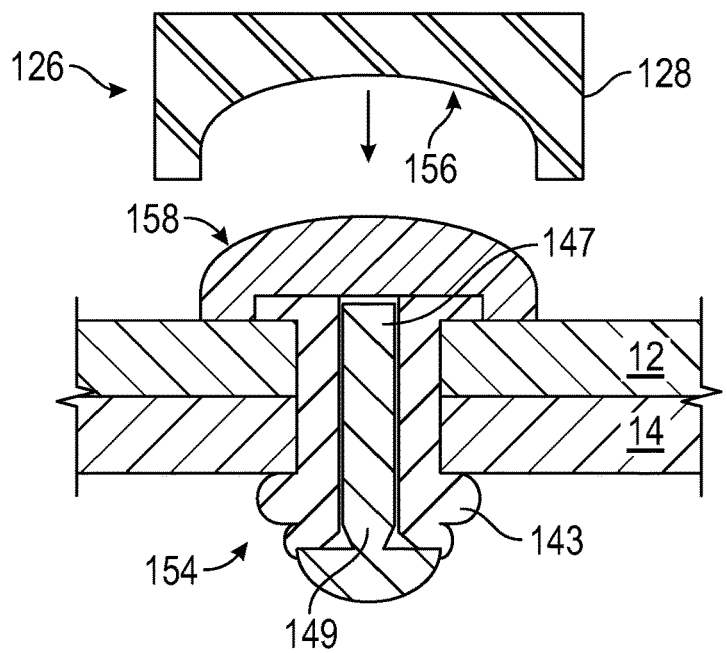
FIG. 6 is a schematic diagram of the joint of FIG. 5, after application of the second ultrasonic pulse.

Referring now to FIGS. 5-6, a second embodiment is shown, which is similar to the first embodiment except for the differences outlined below. The second embodiment is particularly useful where access to the first and second substrates 12, 14 is only available from one side. Referring to FIG. 5, the rivet 140 includes a rivet head 142 contiguous with a shank, referred to herein as rivet body 143, and a mandrel 147 movable within a hollow center 145. The mandrel 147 includes a mandrel head 149 and mandrel stem 151. Referring to FIG. 6, the joint 154 is accessible only from an accessible side A, as opposed to a blind side B.

Referring to FIGS. 5-6, per block 106 of the method 100, a joint 154 may be formed by inserting the rivet 140 into the first and second substrates 12, 14 at the predefined target area 24. The rivet 140 may be positioned via a pre-drilled hole in the first and second substrates 12, 14. In accordance with the second embodiment, the mandrel head 149 is axially loaded with sufficient pull force F through the hollow center 145 such that the rivet body 143 expands against an underside of the first and second substrates 12, 14. The mandrel 147 is configured to break or snap at a notch 153, at a predetermined resisting force.

FIG. 6 shows the joint 154 formed with the rivet 140 such that the mandrel head 149 is encapsulated at the blind side B of the predefined target area 24 and the mandrel stem 151 is ejected. As per block 108 of FIG. 1, a second ultrasonic pulse ($P_2$) is applied via a horn 128 of an ultrasonic device 126. Referring to FIG. 6, the surface profile 158 of the crust layer 150 may be fashioned via compression of the horn inner cavity 156 over the crust layer 150 such that the surface profile 158 of the crust layer 150 inversely corresponds to a shape of the horn inner cavity 156. Per block 110 of the method 100, the crust layer 150 (molten) is cooled down to harden into a seal 160 configured to prevent entry of moisture between the body of the rivet 140 and the respective exterior surface 16 of the first substrate 12, or between the rivet 140 and surrounding first and second substrates 12, 14, thereby reducing galvanic corrosion.

The controller C of FIG. 2 may include a respective computer-readable medium (also referred to as a processor-readable medium), including a non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which may constitute a main memory. Such instructions may be transmitted by one or more transmission media, including coaxial cables, copper wire and fiber optics, including the wires that comprise a system bus coupled to a processor of a computer. Some forms of computer-readable media include, for example, a floppy disk, a flexible disk, hard disk, magnetic tape, other magnetic medium, a CD-ROM, DVD, other optical medium, punch cards, paper tape, other physical medium with patterns of holes, a RAM, a PROM, an EPROM, a FLASH-EEPROM, other memory chip or cartridge, or other medium from which a computer can read.

Look-up tables, databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store may be included within a computing device employing a computer operating system such as one of those mentioned above, and may be accessed via a network in one or more of a variety of manners. A file system may be accessible from a computer operating system, and may include files stored in various formats. An RDBMS may employ the Structured Query Language (SQL) in addition to a language for creating, storing, editing, and executing stored procedures, such as the PL/SQL language mentioned above.

The detailed description and the drawings or FIGS. are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

What is claimed is:

1. A method of riveting a first substrate and a second substrate with a rivet having a rivet head and a rivet body, the first and second substrates having respective exterior surfaces and respective interior surfaces, the method comprising:
    placing the respective interior surfaces of the first and second substrates adjacent to one another at a predefined target area;
    delivering a first ultrasonic pulse to the respective exterior surface of the first substrate at the predefined target area via an ultrasonic device, the first ultrasonic pulse being configured to soften the first substrate at a first softening temperature;
    attaching a crust layer on the rivet head, the crust layer and the rivet head being composed of dissimilar materials;
    forming a joint by inserting the rivet into the first and second substrates at the predefined target area;
    applying a second ultrasonic pulse to the predefined target area such that sufficient heat is generated to soften the crust layer at a second softening temperature, via the ultrasonic device, the second ultrasonic pulse having a relatively higher energy than the first ultrasonic pulse; and
    cooling the crust layer to harden into a seal configured to prevent entry of moisture between the rivet and the respective exterior surface of the first substrate.

2. The method of claim 1, wherein the ultrasonic device includes a horn having a horn inner cavity, the method further comprising:
    fashioning a surface profile of the crust layer via compression of the horn inner cavity over the crust layer, the surface profile of the crust layer being configured to inversely correspond to a shape of the horn inner cavity.

3. The method of claim 1, wherein:
    the rivet is composed of a metal; and
    the crust layer is composed of a thermoplastic composite.

4. The method of claim 1, wherein the first substrate and the second substrate are each composed of carbon fiber nylon composite.

5. The method of claim 1, wherein said attaching the crust layer on the rivet head includes:
    dipping the rivet head into a molten solution; and
    solidifying the molten solution to form the crust layer.

6. The method of claim 1, wherein said attaching the crust layer on the rivet head includes:
    applying an adhesive layer between the crust layer and the rivet head; and curing the adhesive sufficiently that a melting point of the adhesive layer is higher than a melting point of the crust layer.

7. The method of claim 1, wherein the second softening temperature is higher than the first softening temperature.

8. The method of claim 1, wherein the ultrasonic device includes an anvil having an anvil inner cavity, and further comprising:
   melting a portion of the respective exterior surface of the second substrate at the predefined target area, via the second ultrasonic pulse, to create a button layer at least partially around the rivet body; and
   fashioning a surface profile of the button layer via compression of the anvil inner cavity over the button layer, the surface profile of the button layer being configured to inversely correspond to a shape of the anvil inner cavity.

9. The method of claim 1, wherein said forming the joint includes:
   positioning the rivet at the predefined target area and applying a compressive force, via the horn of the ultrasonic device, to push the rivet body into the first and second substrates at the predefined target area.

10. The method of claim 1, wherein the rivet includes mandrel positioned in a hollow center, the mandrel having a mandrel head and a mandrel stem, wherein said forming the joint includes:
   axially loading the mandrel head with a sufficient pull force into the hollow center such that the rivet body expands against the first and second substrates, the mandrel being configured to break at a notch at a predetermined resisting force; and
   ejecting the mandrel stem such that the mandrel head is encapsulated at a blind side of the predefined target area.

11. A method of riveting a first substrate and a second substrate with a rivet having a rivet head, a rivet body and a mandrel positioned in a hollow center, the first and second substrates having respective exterior surfaces and respective interior surfaces, the method comprising:
   placing the respective interior surfaces of the first and second substrates adjacent to one another at a predefined target area;
   delivering a first ultrasonic pulse to the respective exterior surface of the first substrate at the predefined target area via an ultrasonic device, the first ultrasonic pulse being configured to soften the first substrate at a first softening temperature;
   attaching a crust layer on the rivet head, the crust layer and the rivet head being composed of dissimilar materials;
   wherein the mandrel includes a mandrel head and a mandrel stem;
   axially loading the mandrel head with a sufficient pull force into the hollow center such that the rivet body expands against the first and second substrates, the mandrel being configured to break at a notch at a predetermined resisting force;
   forming a joint with the rivet body such that the mandrel head is encapsulated at a blind side of the predefined target area and the mandrel stem is ejected;
   applying a second ultrasonic pulse to the predefined target area, via the ultrasonic device, such that sufficient heat is generated to soften the crust layer at a second softening temperature, the second ultrasonic pulse having a relatively higher energy than the first ultrasonic pulse;
   wherein the ultrasonic device includes a horn having a horn inner cavity;
   fashioning a surface profile of the crust layer via compression of the horn inner cavity over the crust layer, the surface profile of the crust layer inversely corresponding to a shape of the horn inner cavity; and
   cooling the crust layer to harden into a seal configured to prevent entry of moisture between the rivet head and the respective exterior surface of the first substrate.

12. The method of claim 11, wherein the crust layer is composed of a thermoplastic composite.

13. The method of claim 11, wherein the rivet is composed of a metal.

14. The method of claim 11, wherein the first substrate and the second substrate are each composed of carbon fiber nylon 6 composite.

15. The method of claim 11, wherein said attaching the crust layer on the rivet head includes:
   dipping the rivet head into a molten solution; and
   solidifying the molten solution to form the crust layer.

* * * * *